US 6,593,023 B2

(12) United States Patent
Chang et al.

(10) Patent No.: US 6,593,023 B2
(45) Date of Patent: Jul. 15, 2003

(54) BATTERY AND METHOD OF MAKING THE SAME

(75) Inventors: Hao Chang, Bethel, CT (US); Ignacio Chi, Southbury, CT (US)

(73) Assignee: The Gillette Company, Boston, MA (US)

( * ) Notice: Subject to any disclaimer, the term of this patent is extended or adjusted under 35 U.S.C. 154(b) by 90 days.

(21) Appl. No.: 09/843,641

(22) Filed: Apr. 27, 2001

(65) Prior Publication Data

US 2002/0160251 A1 Oct. 31, 2002

(51) Int. Cl.[7] .............................. H01M 4/96; H01M 4/88
(52) U.S. Cl. ........................ 429/44; 502/101; 29/623.1; 423/460
(58) Field of Search .................. 502/101; 423/460; 429/27, 44, 217; 29/623.1

(56) References Cited

U.S. PATENT DOCUMENTS

| | | | | |
|---|---|---|---|---|
| 1,287,634 A | * | 12/1918 | Chaney | 423/460 X |
| 4,111,842 A | * | 9/1978 | Van Montfoort et al. | 429/44 X |
| 4,396,693 A | * | 8/1983 | Bernstein et al. | 429/217 |
| 4,970,128 A | * | 11/1990 | Itoh et al. | 429/44 X |
| 5,772,974 A | * | 6/1998 | Ohsahi et al. | 423/460 X |
| 6,200,457 B1 | * | 3/2001 | Durand et al. | 502/101 X |
| 6,277,513 B1 | * | 8/2001 | Swathirajan et al. | 429/44 |

FOREIGN PATENT DOCUMENTS

| | | | | |
|---|---|---|---|---|
| EP | 0 051 432 | * | 5/1982 | H01M/4/88 |
| WO | WO 00/36676 | * | 6/2000 | H01M/4/96 |
| WO | WO 00/36677 | | 6/2000 | |

OTHER PUBLICATIONS

K. Kinoshita, Carbon: Electrochemical and Physiochemical Properties, Wiley 1987, p. 86–89 (date unknown).
Donnet, Bansal, and Wang, *Carbon Black Science and Technology*, Second Edition, Revised and Expanded, Marcel Dekker, Inc., New York, p. 62–64 and p. 177–178 (date unknown).

* cited by examiner

*Primary Examiner*—Stephen Kalafut
(74) *Attorney, Agent, or Firm*—Fish & Richardson P.C.

(57) ABSTRACT

A method of making a battery having a cathode includes contacting carbon particles with an oxidizing agent, such as, for example, an inorganic acid, an organic acid, or an oxidizing gas, and incorporating the carbon particles into the cathode. The cathode can be used, for example, in a metal-air battery that includes a monolayer or dual-layer cathode, or in a fuel cell.

39 Claims, 1 Drawing Sheet

FIGURE
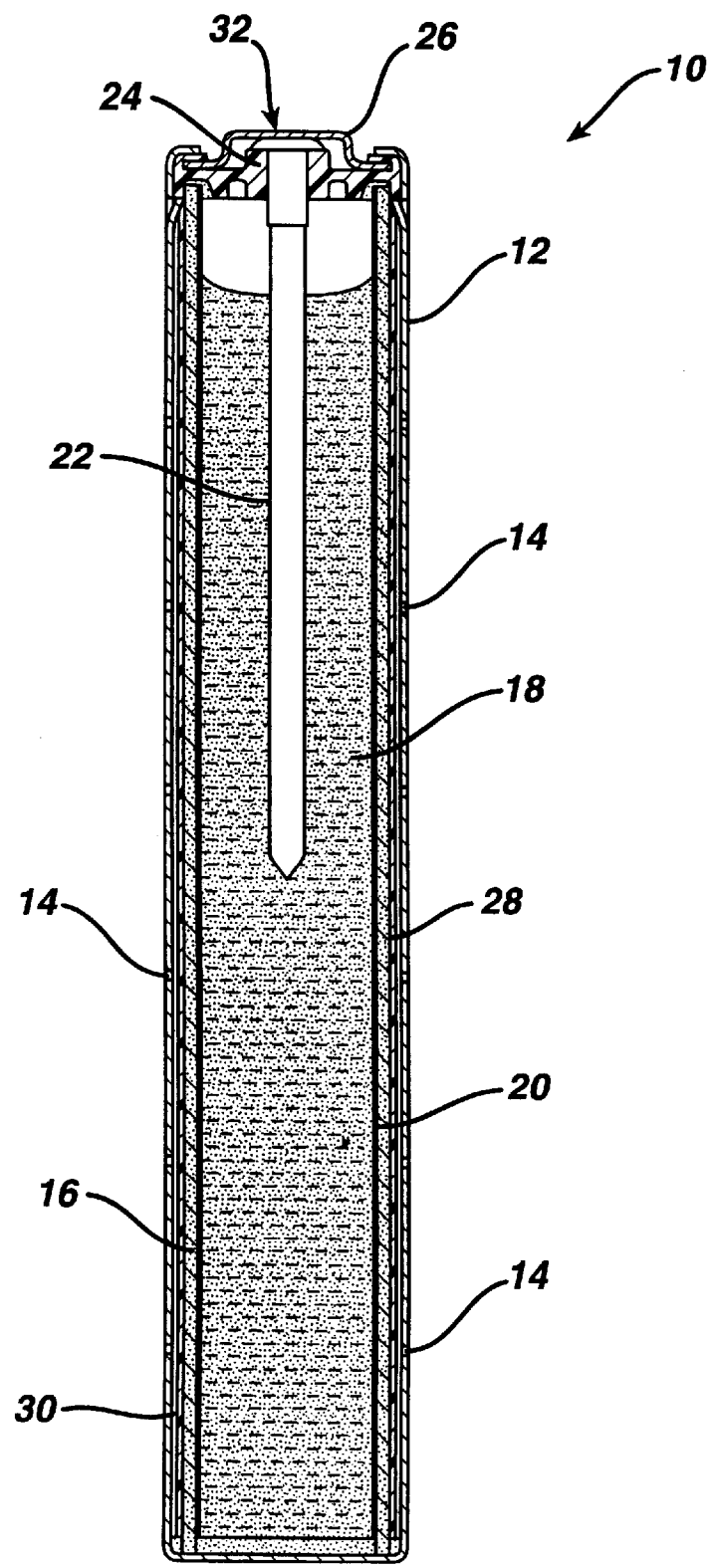

BATTERY AND METHOD OF MAKING THE SAME

BACKGROUND

This invention relates to batteries.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, such as a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal-air electrochemical cell, oxygen is supplied to the cathode from the atmospheric air external to the cell through one or more air access opening(s) in the cell container. The oxygen is an active material that is reduced to hydroxide ions at the cathode, which can include a catalyst supported on carbon particles. A metal, e.g., zinc, is another active material that is oxidized at the anode.

When used in devices, such as high power devices, it is desirable for the electrochemical cell to be able to support good current density.

SUMMARY

The invention relates to batteries, such as metal-air batteries, that can sustain relatively high current density with relatively minimal voltage drop, for example, when used in high rate applications.

In one aspect, the invention features a cathode including carbon particles, for example, carbon blacks, that have been exposed to an oxidizing condition, for example, by contacting the carbon particles with an oxidizing agent such as an inorganic acid or an organic acid. Because the carbon particles have been oxidized, they have acidic surface functional groups, oxidized carbon functionalities, and/or a low pH, e.g., less than about 7, or between about 2 and about 4.

Without wishing to be bound to theory, it is believed that oxidized carbon particles have a chemically modified surface that is more polar than non-oxidized carbon particles. The oxidized carbon particles can draw more electrolyte into the cathode than non-oxidized carbon particles because the electrolyte can wet oxidized particles with polar surfaces more easily than the electrolyte can wet non-oxidized particles with relatively less polar surfaces. As a result, more of the cathode can be effectively used for the reduction-oxidation reactions that occur in the battery.

When incorporated in the cathode of a battery, for example, a metal-air battery, the oxidized carbon particles generally provide the battery with relatively high rate, which is useful for high power devices. The cathode has good physical integrity, with minimized cracks and/or holes. In embodiments in which the cathode has a dual-layer construction, the cathode has relatively low impedance, good adhesion, and good cohesion. While providing good current performance, the dual-layer cathode can also provide good protection against electrolyte permeation and leakage, e.g., when the cathode has a layer with oxidized carbon particles and a layer with non-oxidized carbon particles. Generally, cathodes with oxidized carbon particles are relatively simple and convenient to manufacture.

In another aspect, the invention features a method of making a battery having a cathode. The method includes contacting carbon particles with an inorganic acid or an organic acid, and incorporating the carbon particles into the cathode. The cathode can further include manganese dioxide and polytetrafluoroethylene. The cathode can be a monolayer cathode or a dual-layer cathode. The battery can be a metal-air battery, such as a zinc-air battery.

In another aspect, the invention features a cathode for a metal-air battery. The cathode may include a first layer having carbon particles that have not been treated with an acid, and a second layer having carbon particles that have been treated with an acid. The layers may include a catalyst and/or a polymer, such as polytetrafluoroethylene.

As used herein, "oxidized carbon particles" refer to carbon particles that have been exposed to an oxidizing condition, e.g., contact with an oxidizing agent. For example, oxidized carbon particles may have enhanced acidic surface oxides or functional groups, oxidized carbon functionalities, and/or a low pH. "Non-oxidized carbon particles" refer to carbon particles that have not been exposed to an oxidizing condition.

Other features, objects, and advantages of the invention will be apparent from the description and drawings, and from the claims.

DESCRIPTION OF DRAWING

The FIGURE is an elevational, cross-sectional view of a metal-air battery.

DETAILED DESCRIPTION

Referring to the FIGURE, a cylindrical metal-air battery 10 includes a housing 12 having air access openings 14, a cathode tube 16, an anode 18, and a separator 20 between cathode tube 16 and anode 18. Battery 10 further includes an anode current collector 22, a seal assembly 24, and a metal top cap 26.

Cathode tube 16 includes a blend of one or more catalysts, carbon particles and a binder.

The catalyst is made of finely-divided particles of metal and/or metal oxide that can catalyze the reduction of oxygen and/or catalyze the breakdown of peroxide. These catalysts include, but are not limited to, manganese compounds, precious metals, metal heterocycles, cobalt, and mixtures thereof. The catalyst preferably includes manganese oxides, such as $Mn_2O_3$, $Mn_3O_4$, and $MnO_2$, because they can remediate peroxide in the cathode, and thereby reduce decreases in voltage. A manganese oxide-containing catalyst can be prepared, for example, by heating manganese nitrate or by reducing potassium permanganate. Commercially available manganese oxides can also be used, such as chemically-synthesized manganese dioxide (CMD) available from Sedema as Faridiser M. The catalyst preferably has relatively small particle size (e.g., by grinding the catalyst particles to an average particle size of about 1–2 microns), relatively high surface areas (e.g., greater than 100 $m^2/g$), and relatively high porosity. The catalyst particles can be dispersed on a support, such as carbon. The loading of the catalyst may vary from 0.1 to 20% by weight.

The carbon particles include carbon particles that have been treated with one or more strong oxidizing agents. It is believed that the oxidizing agents enhance the concentration of acidic surface oxides, e.g., carbon-oxygen surface structures, on the carbon particles. The oxidized carbon particles can have, for example, oxidized carbon functionalities and/or acidic surface functional groups such as carboxylic, lactonic, and phenolic. Some carbon particles that include acidic surface oxides are available commercially, such as Monarch 1300, which has a reported pH of about 2–4, (available from Cabot Corp. (Billerica, Mass.)), and Degussa FW-18 (available from Degussa-Hüls AG (Germany)).

In addition, oxidized carbon particles can be formed by exposing non-oxidized carbon particles to an oxidizing condition, e.g., contact with an oxidizing agent. Examples of non-enhanced carbon particles include Black Pearls 2000, Vulcan XC-72 (Cabot Corp., Billerica, Mass.), Shawinigan Acetylene Black (Chevron, San Francisco, Calif.), and Ketjen Black (Akzo Nobel, Chicago, Ill.). Some of these non-oxidized carbon particles have reported pHs between about 6 and about 8. These non-oxidized carbon particles can be provided with enhanced acidic surface oxides, for example, by treating the particles with an inorganic acid and/or an organic acid to form acidic surface functional groups and/or oxidized carbon functionalities on the carbon particles. Inorganic acids can include, for example, nitric acid, sulfuric acid, hydrochloric acid, phosphoric acid, and mixtures thereof. Organic acids can include, for example, peracetic acid, trifluoroacetic acid, and mixtures thereof. Other chemical oxidizing agents include, for example, $KMnO_4$ and $KClO_3$.

A sample of oxidized carbon particles was prepared according to the following illustrative procedure. Seventy-five grams of non-oxidized carbon particles (Vulcan XC-72) was mixed with a solution of 1 L of water and 500 mL of nitric acid (reagent grade, 70%). The mixture was heated at about 60° C., with stirring, for about one hour. After cooling to room temperature, the mixture was filtered using two layers of acid-resistant filter paper. The separated carbon particles were transferred to a large beaker, allowed to mix with 1.5 L of deionized water for at least thirty minutes, and filtered. The carbon particles were washed with deionized water, sometimes up to 9–10 times, until the filtrate had a pH of about 5–6. Then, the carbon particles were dried overnight in a Class A oven at 80° C. The dried cake of carbon particles was then ground in a mortar and pestle.

Examples of binders include polyethylene powders, polyacrylamides, Portland cement and fluorocarbon resins, such as polyvinylidene fluoride and polytetrafluoroethylene. An example of a polyethylene binder is sold under the tradename Coathylene HA-1681 (Hoechst). A preferred binder includes polytetrafluoroethylene (PTFE) particles. The binder can make the cathode relatively moisture resistant, thereby reducing the likelihood of electrolyte leakage from the battery.

A blend of catalyst(s), preferably oxidized carbon particles, and a binder can be used to form monolayer cathodes and dual-layer cathodes.

In some embodiments of monolayer cathodes, the cathode is formed by mixing the catalyst with the oxidized carbon particles, and then mixing this mixture with a binder dispersion (about 60% by weight solids) and isopropanol in a double-planetary mixer to form a dough (about 7–15% by weight solids). The prepared dough is rolled onto a screen substrate, such as a nickel or nickel-plated steel screen, using a Rondo pastry mixer to form a flat sheet cathode with a desired thickness. The rolled cathode is air dried, and then dried, in air or under vacuum, in an oven at 300° C., e.g., to remove any residual volatiles from the cathode. The resulting cathode includes about 1% to about 25% of catalyst such as $MnO_2$ (Faradiser M from Sedema); about 25% to about 94% of oxidized carbon particles; and about 5% to about 50% of binder (PTFE, T-30 available from DuPont). Preferably, the cathode includes about 15% to about 20% of the catalyst; about 45% to about 60% of the oxidized carbon; and about 25% to about 35% of the binder.

For dual-layer cathodes, the cathode has a side that faces anode gel 18 and a side that faces air access openings 14. The side facing anode gel 18 is sometimes referred to as the active or catalyst layer, and the side facing air access openings 14 is sometimes referred to as the hydrophobic or air layer. The cathode also includes a current collector, such as a wire mesh, that electrically contacts the cathode to the housing.

The air layer mixture includes any of the above-listed carbon particles, preferably non-oxidized carbon particles such as Vulcan XC-72, mixed with a polymer, e.g., PTFE, dispersion (60% by weight solids) and isopropanol. In some embodiments, non-oxidized carbon particles in the air layer can minimize electrolyte in the catalyst layer from migrating to the air layer and leaking out the battery. The air layer mixture includes about 50% to about 80% of non-oxidized carbon particles, and about 20% to about 50% of polymer. Preferably, the air layer includes about 60% to about 70% of non-oxidized carbon particles, and about 30% to about 40% of polymer.

The air layer mixture is formed into a dough (about 30–50% solids by weight) that is then rolled onto a current collector, such as a nickel or nickel-plated steel screen, using a Rondo pastry mixer to form a structure with a desired thickness. In some embodiments, the current collector is located in the air layer or at the interface between the catalyst and air layers. The rolled structure is air dried, and then dried, in air or under vacuum, in an oven at 300° C., e.g., to remove any residual volatiles from the cathode.

The catalyst layer mixture is formed by mixing the catalyst with the oxidized carbon particles, and then mixing this mixture with a binder dispersion (about 60% by weight solids) and isopropanol in a double-planetary mixer to form a dough (about 7–15% by weight solids). The resulting catalyst layer mixture includes about 1% to about 25% of catalyst such as $MnO_2$ (Faradiser M from Sedema); about 45% to about 98% of oxidized carbon particles; and about 1% to about 30% of binder (PTFE, T-30 available from DuPont). Preferably, the catalyst layer mixture includes about 15% to about 25% of the catalyst; about 60% to about 84% of the oxidized carbon; and about 1% to about 10% of the binder.

The prepared dough of the catalyst layer mixture is then rolled onto the air layer/current collector structure using a Rondo pastry mixer to form a dual layer cathode with a desired thickness. The rolled cathode is air dried, and then dried, in air or under vacuum, in an oven at 300° C., e.g., to remove any residual volatiles from the cathode.

The formed monolayer or dual-layer cathode is then formed into a tube. The outside of the formed cathode, e.g., tube 16, which faces battery openings 14, can be covered by a barrier membrane 28, such as a PTFE membrane. Membrane 28 helps maintain a consistent humidity level in battery 10. Membrane 28 also helps to prevent the electrolyte from leaking out of the cell and $CO_2$ from leaking into the cell, while preserving air permeability so oxygen can diffuse into the cell and the cathode. In some embodiments, battery 10 also includes an air disperser (not shown), or blotter material, between membrane 28 and air access openings 14. The air disperser is a porous or fibrous material that helps to maintain an air diffusion space between membrane 28 and housing 12.

A separator 20 is placed in cathode tube 16. Separator 20 can be a porous, electrically insulating polymer, such as polypropylene rendered hydrophilic by chemical surfactants, that allows the electrolyte to contact the cathode.

To assemble battery 10, cathode tube 16, which is wrapped with barrier membrane 28 and optionally the air disperser, and includes separator 20, is placed in can 12. For sealing the cathode, can 12 may include a conductive hot melt (not shown), e.g., a polyamide loaded with carbon, graphite, or nickel. The cathode current collector should electrically contact the bottom of can 12. Electrical contact may be made by providing direct physical contact between the cathode current collector and the bottom of the can, for example, by welding the current collector to the bottom of the can. Alternatively, a conductive tab can be attached to both the current collector and to the bottom of the can. Cathode tube 16 and can 12 together define an air plenum 30 therebetween.

After cathode tube 16 is inserted, the inner cavity formed by separator 20 and cathode tube 16 is then filled with anode gel 18.

Anode gel 18 contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in pending U.S. Ser. No. 09/156,915, filed Sep. 18, 1998, U.S. Pat. No. 6,284,410, and pending U.S. Ser. No. 09/115,867, filed Jul. 15, 1998, each of which is incorporated by reference in its entirety.

The particles of the zinc can be spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0–3 wt % on 60 mesh screen;

40–60 on 100 mesh screen;

30–50 wt % on 200 mesh screen;

0–3 wt % on 325 mesh screen; and

0–0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

After anode gel 18 has been placed into can 12, a pre-assembled top assembly 32 is placed on the top of can 12. Top assembly 32 includes seal 24, current collector 22, and top cap 26 welded to current collector 22. Current collector 22 is made from a suitable metal, such as brass. Seal 24 can be made, for example, of nylon. Additional non-conductive hot melt (BiWax Corp.) is placed between seal 24 and cathode tube 16 to minimize leakage of the electrolyte and anode material. The upper external periphery (i.e., the lip) of can 12 is then swaged down over pre-assembled top assembly 32 to seal top assembly 32 at the top of can 12.

During storage, battery 10 can be covered with a removable sheet that covers battery openings 14. The sheet, for example, an oxygen-impermeable and hydrogen permeable sheet, restricts the flow of air between the interior and exterior of the battery. The user peels the sheet from the battery prior to use to allow oxygen from the air to enter the interior of the battery. The battery can also be stored in a sealed metal bag. The user removes the battery from the bag before use.

Other embodiments of metal-air batteries and methods of making them are described in U.S. Pat. No. 6,232,007; U.S. Pat. No. 6,265,104; U.S. Pat. No. 6,479,188; pending U.S. Ser. No. 09/427,371, filed Oct. 26, 1999; and U.S. Pat. No. 6,423,438, all hereby incorporated by reference in their entirety.

In other embodiments, the wettability of the cathode can be enhanced by using other chemical methods. For example, the cathode may include a surfactant; the cathode may include a polar additive to make non-oxidized carbon particles more wettable; and the cathode may include a hydrophilic polymer such as polyvinyl alcohol. Non-oxidized carbon particles can be oxidized by contacting the carbon particles with an oxidizing gas, such as, for example, gaseous forms of the acids listed above, air (e.g., between 350–700° C.), $NO_2$/air, NO/air, oxygen, $N_2O$, $CO_2$, and ozone. Other carbon particles include, for example, activated carbon such as Calgon PWA (Calgon Carbon, Pittsburgh, Pa.). The air layer of a dual-layer cathode can include oxidized carbon particles. Battery 10 can include prismatic batteries, button cells, and other forms of metal-air batteries.

In some embodiments, the oxidized carbon particles described above can be incorporated into one or more air electrodes in a fuel cell.

Other embodiments are within the claims.

What is claimed is:

1. A method of making a battery having a cathode, the method comprising:
   contacting carbon particles with an inorganic acid; and
   incorporating the carbon particles into the cathode,
   wherein the battery is a metal-air battery.

2. The method of claim 1, wherein the carbon particles have a pH less than about 7 after contact with the inorganic acid.

3. The method of claim 1, wherein the carbon particles have a pH between about 2 and about 4 after contact with the inorganic acid.

4. The method of claim 1, further comprising incorporating manganese dioxide into the cathode.

5. The method of claim 4, further comprising incorporating polytetrafluoroethylene into the cathode.

6. The method of claim 5, wherein the cathode comprises:
   about 25% to about 94% of the carbon particles by weight;
   about 1% to about 25% of the catalyst by weight; and
   about 5% to about 50% of the polymer by weight.

7. The method of claim 5, wherein the cathode comprises:
   about 45% to about 60% of the carbon particles by weight;
   about 15% to about 20% of the catalyst by weight; and
   about 25% to about 35% of the polymer by weight.

8. The method of claim 1, wherein the inorganic acid comprises sulfuric acid.

9. The method of claim 1, wherein the inorganic acid comprises nitric acid.

10. The method of claim 1, wherein the cathode is a dual-layer cathode.

11. The method of claim 10, further comprising incorporating carbon particles that have not been contacted with an acid into the dual-layer cathode.

12. The method of claim 1, wherein the battery comprises an anode comprising zinc.

13. A method of making a battery having a cathode, the method comprising:
   contacting carbon particles with an oxidizing gas; and
   incorporating the carbon particles into the cathode,
   wherein the battery is a metal-air battery.

14. The method of claim 13, wherein the oxidizing gas comprises a material selected from a group consisting of air, oxygen, carbon dioxide, nitrogen oxide, and ozone.

15. The method of claim 13, wherein the cathode comprises:
   about 25% to about 94% of the carbon particles by weight;
   about 1% to about 25% of a catalyst by weight; and
   about 5% to about 50% of a polymer by weight.

16. The method of claim 13, wherein the cathode comprises:
   about 45% to about 60% of the carbon particles by weight;
   about 15% to about 20% of a catalyst by weight; and
   about 25% to about 35% of a polymer by weight.

17. The method of claim 13, wherein the cathode is a dual-layer cathode.

18. A method of making a battery having a cathode, the method comprising:
   contacting carbon particles with an oxidizing gas; and
   incorporating the carbon particles into the cathode,
   wherein the cathode is a dual-layer cathode.

19. The method of claim 18, wherein the oxidizing gas comprises a material selected from a group consisting of air, oxygen, carbon dioxide, nitrogen oxide, and ozone.

20. The method of claim 18, further comprising incorporating manganese dioxide into the cathode.

21. The method of claim 18, further comprising incorporating polytetrafluoroethylene into the cathode.

22. A cathode for a metal-air battery, the cathode comprising:
   a first layer comprising:
      carbon particles that have not been contacted with an acid; and
      a first organic polymer; and
   a second layer comprising:
      carbon particles that have been contacted with an acid; and
      a second organic polymer,
   wherein the first and second layers contact each other, and the second layer further comprises a catalyst.

23. The cathode of claim 22, wherein the carbon particles that have been contacted with an acid have a pH less than about 7.

24. The cathode of claim 22, wherein the carbon particles that have been contacted with an acid have a pH between about 2 and about 4.

25. The cathode of claim 22, wherein the catalyst comprises manganese dioxide.

26. The cathode of claim 25, wherein the second layer further comprises about 1% to about 25% of a catalyst by weight.

27. The cathode of claim 25, wherein the first and second organic polymers comprise polytetrafluoroethylene.

28. The cathode of claim 22 wherein:
   the first layer comprises
      about 50% to about 80% of the carbon particles that have not been contacted with an acid by weight; and
      about 20% to about 50% of the first organic polymer by weight; and
   the second layer comprises
      about 45% to about 98% of the carbon particles that have been contacted with an acid by weight; and
      about 1% to about 30% of the second organic polymer by weight.

29. The cathode of claim 22, wherein:
   the first layer comprises
      about 60% to about 70% of the carbon particles that have not been contacted with an acid by weight; and
      about 30% to about 40% of the first organic polymer by weight; and
   the second layer comprises
      about 60% to about 84% of the carbon particles that have been contacted with an acid by weight, and
      about 1% to about 10% of the second organic polymer by weight.

30. A method of making a battery having a cathode, the method comprising:
   contacting carbon particles with an inorganic acid; and
   incorporating the carbon particles into the cathode,
   wherein the cathode is a dual-layer cathode.

31. The method of claim 30, wherein the carbon particles have a pH less than about 7 after contact with the inorganic acid.

32. The method of claim 30, wherein the carbon particles have a pH between about 2 and about 4 after contact with the inorganic acid.

33. The method of claim 30, further comprising incorporating manganese dioxide into to the cathode.

34. The method of claim 33, further comprising incorporating polytetrafluoroethylene into the cathode.

35. The method of claim 30, wherein the cathode comprises:

about 25% to about 94% of the carbon particles by weight;

about 1% to about 25% of a catalyst by weight; and about 5% to about 50% of a polymer by weight.

36. The method of claim 30, wherein the cathode comprises:

about 45% to about 60% of the carbon particles by weight;

about 15% to about 20% of a catalyst by weight; and about 25% to about 35% of a polymer by weight.

37. The method of claim 30, wherein the inorganic acid comprises sulfuric acid.

38. The method of claim 30, wherein the inorganic acid comprises nitric acid.

39. The method of claim 30, further comprising incorporating carbon particles that have not been contacted with an acid into the dual-layer cathode.

* * * * *

UNITED STATES PATENT AND TRADEMARK OFFICE
CERTIFICATE OF CORRECTION

PATENT NO. : 6,593,023 B2  Page 1 of 1
DATED : July 15, 2003
INVENTOR(S) : Hao Chang and Ignacio Chi It is certified that error appears in the above-identified patent and that said Letters Patent is hereby corrected as shown below:

<u>Column 8,</u>
Line 60, after "weight", replace "," with -- ; --.

<u>Column 9,</u>
Line 8, after "into" delete "to".

Signed and Sealed this

Sixteenth Day of March, 2004

JON W. DUDAS
*Acting Director of the United States Patent and Trademark Office*